(12) United States Patent
Wang et al.

(10) Patent No.: US 10,151,328 B2
(45) Date of Patent: Dec. 11, 2018

(54) ALTERNATING-CURRENT PERMANENT MAGNET DRAINING PUMP

(71) Applicant: Jangmen Idear Hanyu Electrical Joint-Stock Co., Ltd., Jiangmen (CN)

(72) Inventors: Hongbiao Wang, Jiangmen (CN); Changjian Li, Jiangmen (CN); Fei Xu, Jiangmen (CN)

(73) Assignee: JANGMEN IDEAR HANYU ELECTRICAL JOINT-STOCK CO., LTD., Guangdong (CN)

( * ) Notice: Subject to any disclaimer, the term of this patent is extended or adjusted under 35 U.S.C. 154(b) by 440 days.

(21) Appl. No.: 14/650,986

(22) PCT Filed: Nov. 22, 2013

(86) PCT No.: PCT/CN2013/087729
§ 371 (c)(1),
(2) Date: Jun. 10, 2015

(87) PCT Pub. No.: WO2014/090078
PCT Pub. Date: Jun. 19, 2014

(65) Prior Publication Data
US 2015/0326087 A1 Nov. 12, 2015

(30) Foreign Application Priority Data

Dec. 12, 2012 (CN) .................. 2012 2 0684710 U
Sep. 12, 2013 (CN) ..................... 2013 1 0415731

(51) Int. Cl.
*F04D 29/62* (2006.01)
*F04D 13/06* (2006.01)
(Continued)

(52) U.S. Cl.
CPC ........... *F04D 29/628* (2013.01); *F04D 13/06* (2013.01); *F04D 13/064* (2013.01);
(Continued)

(58) Field of Classification Search
None
See application file for complete search history.

(56) References Cited

U.S. PATENT DOCUMENTS 2,944,297 A * 7/1960 Maynard ................. B29C 70/58
174/528
7,646,128 B2 * 1/2010 Bode ................... H02K 15/0012
310/211
(Continued)

FOREIGN PATENT DOCUMENTS

CN 101054978 10/2007
CN 101102068 1/2008
(Continued)

OTHER PUBLICATIONS

International Searching Authority, International Search Report, PCT/CN2013/087729, dated Feb. 27, 2014.
(Continued)

*Primary Examiner* — Kenneth J Hansen
(74) *Attorney, Agent, or Firm* — Greer, Burns & Crain, Ltd.

(57) ABSTRACT

An alternating-current permanent magnet drainage pump includes a pump cover, a pump body, a magnetic core, a rotating shaft, a stator core and coils. The coils are wound around a coil former, and the stator core is assembled to the coils. The pump body is a shell formed by surrounding a contour of the coils, the coil former, and the stator core which have been assembled to perform an integrated injection molding. The shell defines a magnetic core accommodating space used for accommodating the magnetic core and having an opening at a top portion. The magnetic core accommodating space extends from the opening to a center of the pump body. A supporting member is arranged in the opening at the top portion of the magnetic core accommodating space for supporting a bearing of the rotating shaft.

19 Claims, 8 Drawing Sheets

(51) Int. Cl.
 *F04D 29/40* (2006.01)
 *F04D 29/66* (2006.01)
 *H02K 21/18* (2006.01)
 *H02K 5/08* (2006.01)
 *H02K 5/167* (2006.01)
 *F04D 29/42* (2006.01)
 *F04D 29/02* (2006.01)

(52) U.S. Cl.
 CPC ......... *F04D 29/026* (2013.01); *F04D 29/406* (2013.01); *F04D 29/426* (2013.01); *F04D 29/669* (2013.01); *H02K 5/08* (2013.01); *H02K 5/1672* (2013.01); *H02K 21/185* (2013.01)

(56) References Cited

U.S. PATENT DOCUMENTS

| | | | |
|---|---|---|---|
| 8,624,451 B2 | 1/2014 | Shi et al. | |
| 2002/0146319 A1* | 10/2002 | Dorsch | F04D 7/045 |
| | | | 415/206 |
| 2004/0037719 A1* | 2/2004 | Sunaga | F04D 13/064 |
| | | | 417/423.8 |
| 2007/0052318 A1* | 3/2007 | Marioni | H02K 1/143 |
| | | | 310/216.037 |
| 2011/0200469 A1* | 8/2011 | Kawabata | F04D 13/0606 |
| | | | 417/423.3 |

FOREIGN PATENT DOCUMENTS

| | | |
|---|---|---|
| CN | 200710143209.3 A | 1/2008 |
| CN | 102223011 | 10/2011 |
| CN | 202954989 | 5/2013 |
| CN | 202954990 | 5/2013 |
| EP | 1503083 | 2/2005 |
| JP | 2008008187 | 1/2008 |

OTHER PUBLICATIONS

International Searching Authority, International Search Report, PCT/CN2013/087729, dated Jun. 12, 2015.

* cited by examiner

ALTERNATING-CURRENT PERMANENT MAGNET DRAINING PUMP

This application is the U.S. National phase application corresponding to PCT/CN2013/087729 which was assigned an international filing date of Nov. 22, 2013 and associated with publication WO 2014/090078 and which claims priority to Chinese Application 201220684710.7 filed on Dec. 12, 2012 and 201310415731.8 filed on Sep. 12, 2012, the disclosures of which are expressly incorporated herein.

TECHNOLOGY FIELD

The present invention relates to a hydraulic pump, and more particularly, to an alternating-current permanent magnet drainage pump.

BACKGROUND

Currently, a U-shaped alternating-current permanent magnet synchronous motor is often applied to a drainage pump, and thus such a drainage pump is often referred to as an alternating-current permanent magnet drainage pump. Such a drainage pump is generally applied to a washing machine or a dishwasher. Since such a drainage pump has a difficulty in starting at a low voltage, the electromagnetic efficiency is thereby limited, and the overall efficiency of the product is low. On the other hand, in recent years, with manufacturers are growing in number, market competition are getting fiercer, and customer requirements are rising higher, pressure on the costs of products has been highlighted, and the noise and vibration problems need to be improved.

During operation of a conventional U-shaped alternating-current permanent magnet drainage pump, there is vibration and collision between coils and a stator core to induce noise. On the other hand, due to presence of a rotor cylinder between the stator core and a rotor, both a thickness of the rotor cylinder itself and a required reasonable gap between the stator core and the rotor shall increase a distance between the stator core and the rotor. Thereby, air gap is increased, operation efficiency is affected, and a size of a pump body is increased, which produces a non-negligible effect for a micro-sized pump.

FIG. 1 shows a structure of a pump shell of a conventional U-shaped alternating-current permanent magnet synchronous motor. As shown in FIG. 1, the pump includes a rotor cylinder 9' in a cylindrical shape, and a core assembly is disposed in an inner cavity of the rotor cylinder. The rotor cylinder is usually made of plastic, with a thickness of 1 mm. Due to the presence of the rotor cylinder, the air gap between the stator core and the rotor magnetic core is increased.

FIGS. 1a and 1b show an alternating-current permanent magnet drainage pump in the prior art. In which, fabricated coils 7' are loaded in a plastic mold to perform injection molding to form a coil package 5'. The injection molding process performed to the coils 7' is same as an injection molding process performed to coils being disclosed in Chinese patent No. 200710143209.3 and titled "A permanent magnet synchronous motor for a drainage pump". That is, after the coil package 5' is formed, a stator core 8' is assembled inside the coil package 5', then a concave arc surface of a concave arc portion of the stator core 8' is sleeved on an outer arc surface of a wall of a rotor housing 17' of a pump body 10', and the coil package 5' and the pump body 10' is fixed into one by a snap 18'.

The above alternating-current permanent magnet drainage pump has the following disadvantages. Firstly, since the stator core 8' is sleeved on the outer wall of the rotor housing 17' such that the stator core 8' and the magnetic core 15' are separated by the rotor housing 17' (usually, the rotor housing 17' has a thickness of at least 1 mm due to a requirement for strength), a distance between the concave arc surface of the stator core 8' and the magnetic core 15' of the rotor is increased (to at least 1.5 mm), resulting in a larger magnetic air gap and thus a greater magnetic resistance and a lower electromagnetic efficiency. Secondly, there are gaps between the stator core 8' and the rotor housing 17', between the stator core and the coil package 5' and between the coil package 5' and the pump 10'. Thereby, during operation, noise will be caused by vibration between various parts or components. Thirdly, heat dissipated by the stator core 8' is thermally conducted only by radiation and to the rotor housing of the pump body 10', resulting in a poor heat dissipation.

SUMMARY

A purpose of the present invention is to overcome the defects in the prior art, and provides an alternating-current permanent magnet drainage pump which reduce noise caused by vibration. In this pump, a magnetic air gap between the stator core and the magnetic core of the rotor assembly is reduced, so as to improve the electromagnetic efficiency of the product, minimize the size of the pump body, lower the manufacturing cost of the drainage pump, reduce vibration and noise generated by the product, and enhance its heat dissipation performance.

In order to achieve the above purpose of the present invention, an alternating-current permanent magnet drainage pump with reduced vibration noise includes a pump cover and a pump body, and further includes a magnetic core, a rotating shaft, a stator core and coils, wherein the coils are wound around a coil former, and the stator core is assembled to the coils, wherein the pump body is a shell body which is formed by conducting an integrated injection molding on a contour of the coils, the coil former, and the stator core being assembled, the shell body is configured to have a magnetic core accommodating space for accommodating the magnetic core which has an opening at its top, and a supporting member is arranged in the opening to support a bearing of the rotating shaft.

In particular, a stator assembly including the coils and the stator core and a rotor assembly including the rotating shaft and the magnetic core being disposed on the rotating shaft are arranged inside the pump body. The pump body includes at least a first pump body portion enclosing hermetically the coils and a second pump body portion for mounting the rotor assembly, and the first pump body portion and the second pump body portion are combined into one. The second pump body portion is provided therein with a cylinder-shaped rotor housing for supporting the rotor assembly, and the magnetic core accommodating space is surrounded and formed by an inner surface of the rotor housing. The second pump body portion is provided with a connection portion to connect to a pump cover. A concave arc portion of the stator core is embedded in the rotor housing.

Preferably, the first pump body portion and the second pump body portion of the pump body are formed by one injection molding or two injection molding.

Wherein, the coils are accommodated in the first pump body portion, and the concave arc portion of the stator core protrudes outside of the first pump body portion.

Wherein, the inner surface of the rotor housing is an arc surface, and the magnetic core accommodating space for accommodating the magnetic core is surrounded and formed by the arc surface together with an inner arc surface of the concave arc portion embedded in the stator core.

In particular, the inner arc surface of the concave arc portion of the stator core is configured to be a part of the inner surface of the rotor housing.

In particular, at least part of the inner arc surface of the stator core protrudes the inner surface of the rotor housing toward an axial center direction.

In particular, the magnetic core accommodating space for accommodating the magnetic core is surrounded and formed by a part of the inner arc surface of the concave arc portion of the stator core together with the inner surface of the rotor housing.

In particular, the magnetic core accommodating space for accommodating the magnetic core is surrounded and formed by entire of the inner arc surface of the concave arc portion of the stator core together with the inner surface of the rotor housing.

Wherein, the rest part of the stator core apart from the inner arc surface of the concave arc portion is sealed and surrounded by the pump body.

In addition, the second pump body portion is provided therein with a water cooling chamber surrounding an outer wall of the rotor housing and having an opening at one end.

Preferably, the stator core is performed with a passivation and electrophoretic process.

In particular, an enclosed end of the rotor housing is provided with a bearing seat.

Wherein, the rotor assembly includes: a rotor shaft with one end fixed to a rotation center of the impeller; a magnetic core sleeved on the rotor shaft, the magnetic core is accommodated in the concave arc portion of the stator core.

In addition, the rotor assembly also includes: a starting mechanism for driving the rotor shaft to rotate together with the magnetic core.

Preferably, the starting mechanism is accommodated at one end of the impeller which is far away from the magnetic core.

Alternatively, the starting mechanism is accommodated at one end of the impeller which is close to the magnetic core.

Alternatively, the starting mechanism is accommodated in the impeller.

Preferably, a rotating gap is provided between the magnetic core and the concave arc portion of the stator core.

Preferably, the rotating gap is 0.5 mm.

Further, it also includes a press cover mounted between the pump cover and the pump body for enclosing the opened end of the water cooling chamber.

In particular, the pump body includes an outer shell body formed by surrounding an outer contour of the assembled coils and the stator core which are assembled, and an inner shell body disposed at a center of an inner cavity of the outer shell body and serving as the magnetic core accommodating space, and the stator core is U-shaped with its two arms extending through a wall of the inner shell body and sandwiching on both sides of the magnetic core, leaving a rotating gap between the two arms of the U-shaped stator core and the magnetic core. Since there is no rotor cylinder as separation between the U-shaped stator core and the magnetic core, the gap between the stator core and the magnetic core can be very tiny.

The alternating-current permanent magnet drainage pump with reduced vibration and noise further includes a stainless steel rotor cylinder; the magnetic core is accommodated in an inner cavity of the stainless steel rotor cylinder; the stainless steel rotor cylinder is accommodated inside the magnetic core accommodating space; and the stator core is a U-shaped with its two arms sandwiching on both sides of the stainless steel rotor cylinder. Since the thickness of the stainless steel could be formed very thin, the gap between the stator core and the magnetic core could be formed very tiny if the stainless steel rotor cylinder is employed.

The pump body further includes a water cooling chamber used for accommodating cooling water. However, it may not include the water cooling chamber. The water cooling chamber being an annular space formed based on an outer contour of a portion where the two arms of the U-shaped stator core interfere with the magnetic core.

The water cooling chamber has an opening at a top portion of the pump body, closely disposed outside the stator core, and a press cover is provided at the opening. During operation, heat generated by the stator core may be quickly transferred to cooling liquid in the water cooling chamber, achieving a purpose of heat dissipation and cooling of the motor and effectively lowering the temperature of the pump motor.

The bearing of the rotating shaft is sealed against and connected to a bearing member for the bearing of the rotating shaft via a sealing ring for the bearing.

The pump cover and the pump body are assembled together and a connection portion thereof is sealed by a sealing ring, to prevent water inside the pump cover from flowing into the pump body.

The pump body is a shell with an enclosed bottom formed by integrated injection molding.

The pump body has an opened bottom which is enclosed by a back cover and is tightly connected with a sealing ring.

Compared with the prior art, the alternating-current permanent magnet drainage pump of the present invention has the following advantages.

1) In the present invention, the stator assembly and the rotor assembly are formed by one-shot injection molding or two-shot injection molding to be accommodated in the pump body, which simplifies the structure of the pump body, reduces the overall size of the pump body, and facilitates the assembly and maintenance of the product.

2) In the pump body of the present invention, the first pump body portion and the second pump body portion are formed through injection molding to the coils and the stator core by means of the molding mold. This avoids resonance of the pump body and reducing noise, facilitates heat dissipation of the stator core through thermal transfer of the pump body, and enhances the heat dissipation efficiency.

3) In the present invention, by means of embedding the concave arc portion of the stator core in the rotor housing of the second pump body portion, the inner arc surface of the rotor housing and the inter arc surface of the concave arc portion of the stator core together surrounds and forms the inner cavity for accommodating the rotor assembly. This reduces the magnetic air gap between the stator core and the magnetic core of the rotor assembly, reduces the magnetic resistance and improves the electromagnetic efficiency. Moreover, being compared with the drainage pump with the conventional structure, less silicon steel sheets, enameled wires and shorter magnetic core may be consumed to achieve a same operation performance to that of the conventional structure, thus reducing the manufacturing cost of the drainage pump.

4) In the present invention, the concave arc portion of the stator core is embedded in the rotor housing of the second pump body portion, thus the stator core may contact with liquid in the rotor housing, thus facilitating quick dissipation of the heat generated by the stator core during the operation.

5) In the present invention, a part of the stator core except the concave arc portion is surrounded by the first pump body portion and the second pump body portion, thus avoiding water leaking in the rotor housing.

6) In the present invention, the water cooling chamber is provided in an outer annual space of the rotor housing, thus the heat generated by the stator core during operation may be quickly transferred to liquid in the water cooling chamber, thereby the heat dissipation of the stator core may be quickened, and the working life of the drainage pump may be prolonged.

7) In the present invention, the stator core is performed with a passivation and electrophoretic process, thus effectively preventing the stator core from rusting. The coils are surrounded by the first pump body portion, thus preventing the coils from contacting air.

8) In the present invention, the stator core, the coil former and the coils which have been assembled are formed integrally to a integral and non-detachable one, thus reducing distances between the components and reducing the overall size. Therefore the components may be compacted, thus preventing vibration and noise and improving the performance of the drainage pump.

Hereinafter, the present invention will be described in detail with reference to the accompanying drawings.

BRIEF DESCRIPTION OF THE DRAWINGS

FIG. 1b is a cross sectional view along line E-E as shown in FIG. 1a;

DETAILED DESCRIPTION

A First Embodiment

Figure 1:
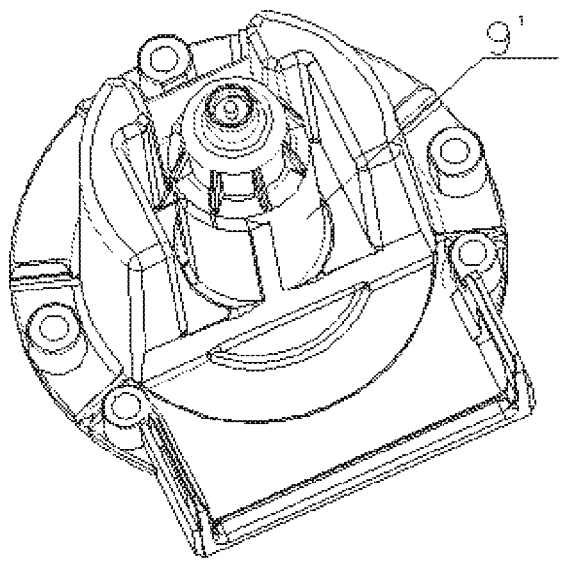
FIG. 1 is a schematic structural diagram of a pump shell of a conventional U-shaped alternating-current permanent magnet synchronous motor.
Figure 1A:
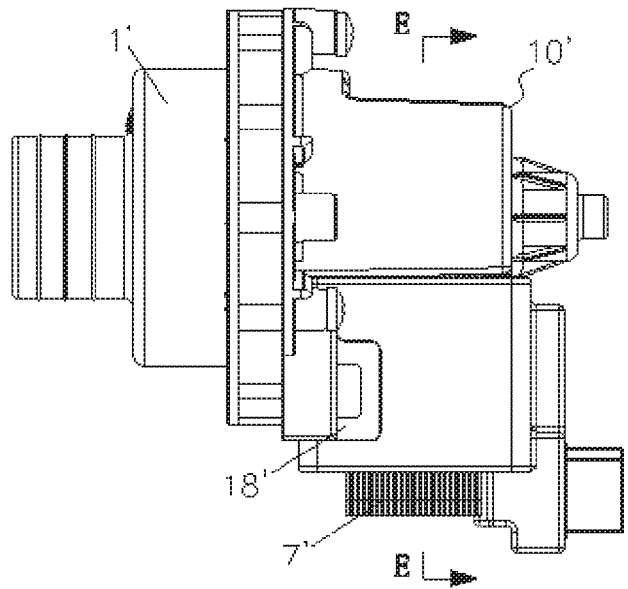
FIG. 1a is a schematic structural diagram of an alternating-current permanent magnet drainage pump having a rotor housing 17' in the prior art.
Figure 1B:
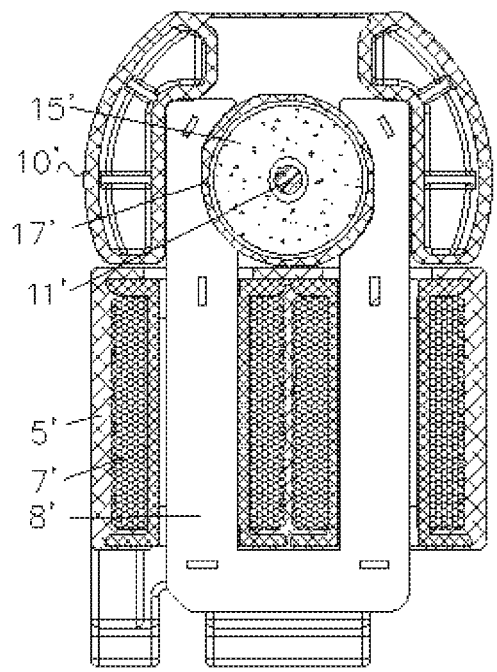
Figure 2:
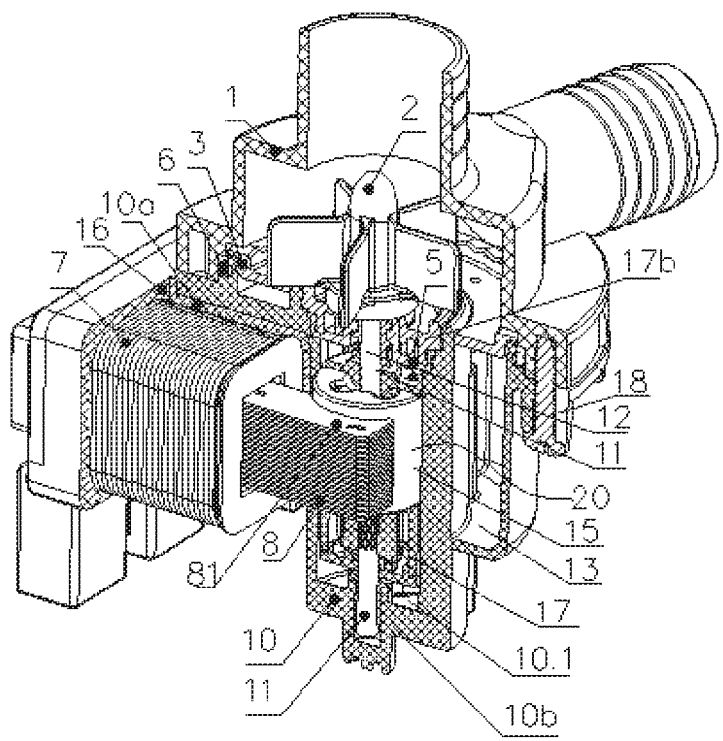
FIG. 2 is a three-dimension cross sectional view of an inner structure of an alternating-current permanent magnet drainage pump of the first embodiment of the present invention.
Figure 3:
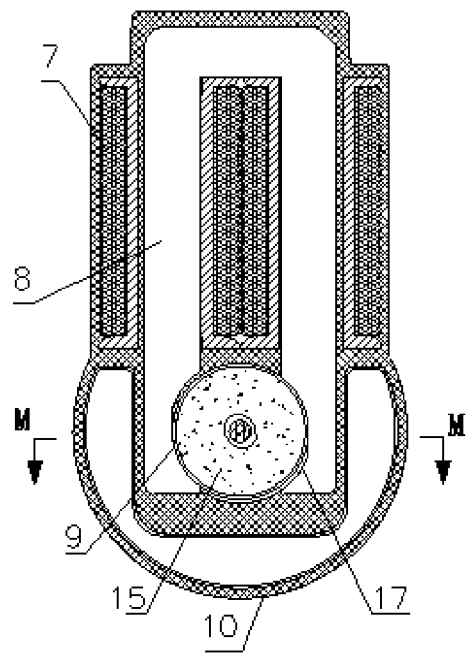
FIG. 3 is a cross sectional view of the structure of the alternating-current permanent magnet drainage pump of the first embodiment of the present invention.

As shown in FIGS. 2 and 3, it is an alternating-current permanent magnet drainage pump without a rotor cylinder of the present invention, including a pump body 10, a pump cover 1, an impeller 2, a stator core 8, coils 7, a magnetic core 15, a rotating shaft 11, a bearing 12 of the rotating shaft and a press cover 3.

The coils 7 are wound around a coil former, and two arms of the U-shaped stator core 8 extend through the coils 7. The coil, former and stator core which have been assembled are injection molded into an integral body to form the pump body 10 having an enclosed bottom and an opening at its top portion. The injection molded pump body 10 includes an outer shell being surrounding an outer contour of the assembled coils and stator core and an inner cylinder being disposed at a center of an inner cavity of the outer shell and serving as a magnetic core accommodating space. The two arms of the U-shaped stator core protrude an inner wall of the inner cylinder. The inner cylinder has an opening at the top portion of the pump body, and a supporting member for supporting the bearing of the rotating shaft is arranged in the opening.

A magnetic core assembly is inserted into the magnetic core accommodating space 10.1 from the top portion of the pump body. The rotating shaft 11 extends through a shaft hole of the magnetic core 15 and from the pump body to the pump cover. An upper end of the rotating shaft 11 is fixed to the impeller 2, for driving the impeller 2 to synchronously rotate with it. In the present embodiment, the magnetic core accommodating space 10.1 is sealed at the bottom, and is opened along an axial direction of the rotating shaft 11, communicate with a space where the two arms of the stator core 8 are located. The two arms of the U-shaped stator core 8 sandwiches on both sides of the magnetic core towards the opening along the axial direction. Since no rotor cylinder separation is required between the stator core 8 and the magnetic core 15, a gap between them may be formed very tiny.

The impeller 2 is provided inside the pump cover 1, and the pump cover 1 and the pump body 10 are assembled to each other to form a complete pump shell. In the present embodiment, the pump body 10 is also provided with a water cooling chamber 13. At least part of a wall of the water cooling chamber is formed to surround a portion where the two arms of the U-shaped stator core interfere with the magnetic core. The water cooling chamber has an opening faced upward and sealed by the press cover 3, thereby it is not communicate with the magnetic core accommodating space 10.1. The water cooling chamber 13 is closely disposed outside the stator core 8, for quickly transferring heat generated by the stator core 8 during operation to cooling liquid in the water cooling chamber 13, achieving a purpose of heat dissipation and cooling of the motor. However, the pump body 10 in another embodiment may also be formed without the water cooling chamber 13.

The press cover 3 of the water cooling chamber may also be provided thereon with a hole, as shown in FIG. 2, such that water in the water cooling chamber may communicate with water in a pump cavity. After the sealing ring at the bearing of the rotating shaft is worn out, water in the water cooling chamber may flow to the pump cavity, and enter the magnetic core accommodating space. The press cover of the water cooling chamber may function to prevent major foreign substance from entering the water cooling chamber.

The opening at the top portion of the inner cylinder is provided with the bearing 12 of the rotating shaft which is hermetically connected to the opening at the top portion of the magnetic core accommodating space via a sealing ring for a bearing 5, and the sealing ring for a bearing 5 prevents water inside the pump cover from flowing into the pump body therethrough. A press cover for a rotor housing 17b also serves as a bearing support for the bearing 12 of the rotating shaft.

A connecting portion of the pump cover 1 and the pump body 10 is provided with a first sealing ring 6, to prevent water in the pump cavity for the impeller operating from leaking during operation.

Figure 3A:
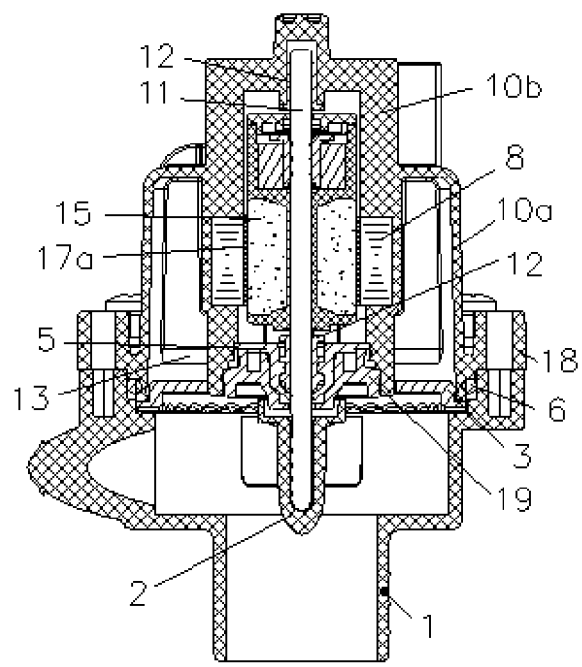
FIG. 3a is a cross sectional view of the alternating-current permanent magnet drainage pump along line M-M as shown in FIG. 3.

As shown in FIGS. 2, 3 and 3a, the pump body 10 includes at least a first pump body portion 10a sealing around the coils of the stator and a second pump body portion 10b for arranging a rotor assembly 20. The second pump body portion 10b is provided therein with a rotor housing 17 which forms the accommodating space 10.1. The rotor housing 17 sleeves on the rotor assembly 20 (including the magnetic core 15 and the rotating shaft 11) and supports it. The water cooling chamber 13 with an opening at one end is formed by surrounding an outer surface of the rotor housing 17.

The pump body 10 of the present embodiment may be formed by one-shot injection molding or two-shot injection molding. Hereinafter, a method for forming the pump body 10 by two-shot injection molding is described for example. In order to manufacture the pump body 10, firstly, the first pump body portion 10a of the pump body 10 is formed by conducting a first shot of injection molding, and then based on the first pump body portion 10a, the second pump body portion 10b being combined with the first pump body portion 10a into one is formed by a second shot of injection molding.

Figure 12:
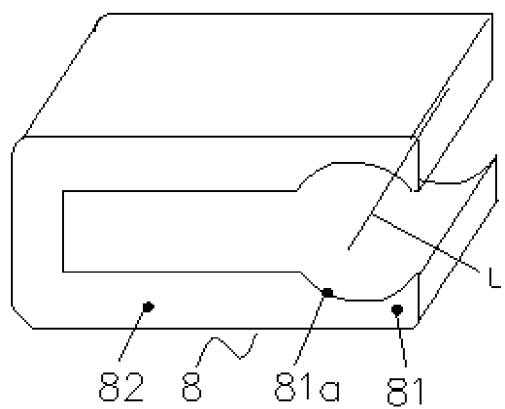
FIG. 12 is a schematic structural diagram of a stator core in an alternating-current permanent magnet drainage pump of the present invention.

Specifically, a injection molding is conducted to prefabricated coils 7 by means of a plastic mold and plastic raw material to form the first pump body portion 10a which surrounds and seals the coils 7, such that all the elements constituting the coils 7 except plug-in wiring terminals are completely isolated from outer atmosphere, so as to avoid the elements constituting the coils 7 contacting air. Through assembling, a part of the stator core 8 (the structure thereof is shown in FIG. 12) is assembled inside the coils 7 being surrounded and sealed by the first pump body portion 10a, and a concave arc portion 81 of the stator core 8 protrudes the first pump body portion 10a.

In the present embodiment, basing on the first pump body portion 10a, a injection molding is performed to form the second pump body portion 10b by means of a molding mold, so that the second pump body portion 10b is combined to the first pump body portion 10a into one and the concave arc portion 81 of the stator core 8 protruding the first pump body portion 10a is embedded into the second pump body portion 10b. The second pump body portion 10b has the rotor housing 17 which sleeve outside of the rotor assembly 20 and supporting it, and a connection portion 18 at an outer edge and for connecting to, the pump cover 1.

In the present embodiment, the water cooling chamber 13 has an opening at one end for receiving cooling liquid, and the opened end of the water cooling chamber 13 is at a same side with the opened end of the rotor housing 17. Accordingly, the press cover 3 for covering the opened end of the water cooling chamber 13 is arranged between the pump cover 1 and the second pump body portion 10b, there is a hole on the cover such that the water cooling chamber is communicate with the pump cavity. A press cover 17b of the rotor housing for sealing the opened end of the rotor housing 17 is provided between the rotor housing 17 and the pump cover 1. Since the concave arc portion 81 of the stator core 8 is embedded in the rotor housing 17 and the water cooling chamber 13 surrounds the outer surface of the rotor housing 17, heat generated by the stator core 8 during operation may be quickly transferred to the cooling liquid in the water cooling chamber 13, so as to achieve heat dissipation and cooling of the drainage pump.

A Second Embodiment

Figure 4:
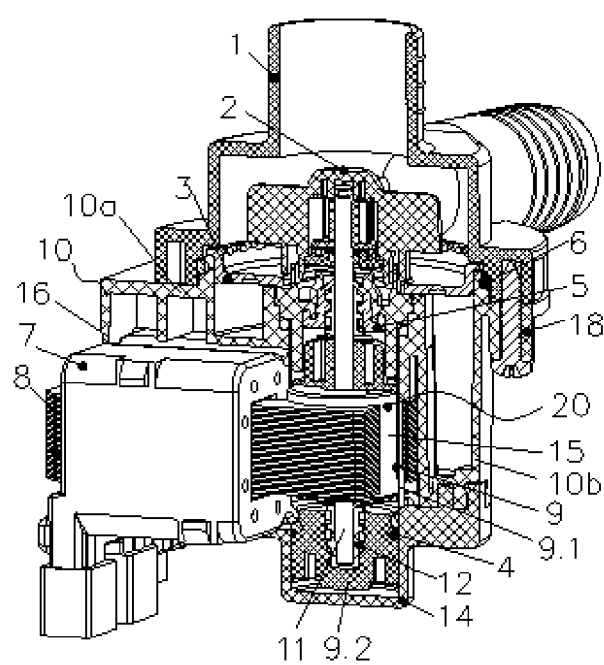
FIG. 4 is a three-dimension cross sectional view of an inner structure of an alternating-current permanent magnet drainage pump of a second embodiment of the present invention.
Figure 5:
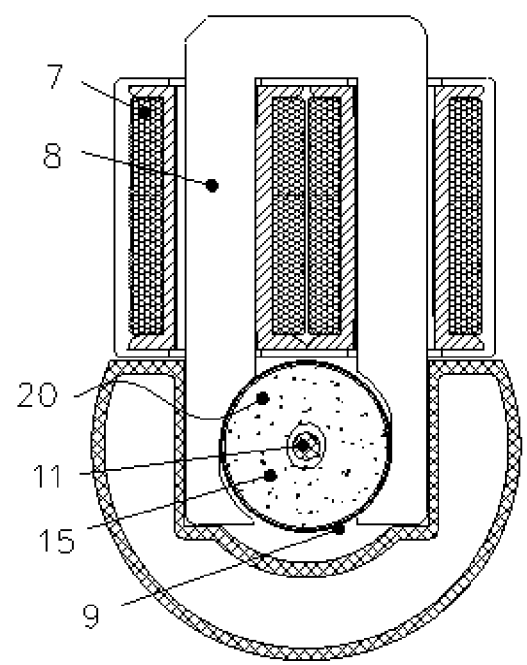
FIG. 5 is a cross sectional view of the structure of the alternating-current permanent magnet drainage pump of the second embodiment of the present invention.
Figure 6:
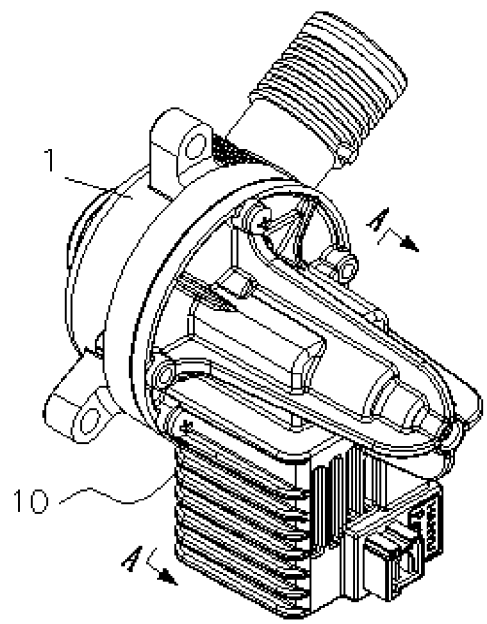
FIG. 6 is a perspective view of an alternating-current permanent magnet drainage pump of the third embodiment of the present invention.
Figure 7:
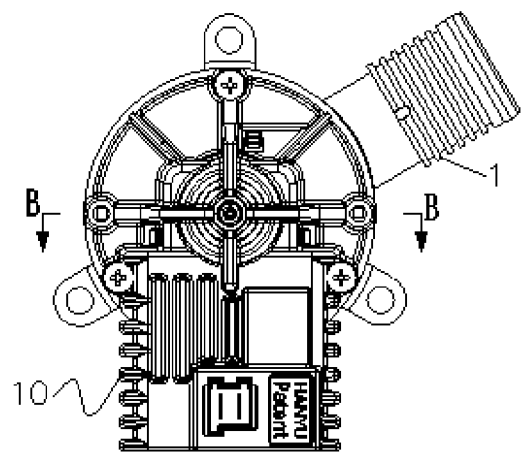
FIG. 7 is a left view of the alternating-current permanent magnet drainage pump as shown in FIG. 6.

As shown in FIGS. 4-5, an alternating-current permanent magnet drainage pump with a stainless steel rotor cylinder 9 includes a pump body 10, a pump cover 1, a back cover 14, an impeller 2, a press cover 3, plastic sealed coils 7, a stator core 8, a rotor cylinder 9, a rotating shaft 11, a bearing 12 of the rotating shaft and a magnetic core 15, etc.

The impeller 2 is set in the pump cover 1. The pump body 10 surrounds a contour of the coils 7, the stator core 8 and the magnetic core 15 which have been assembled, to form a shell with openings at its upper and lower ends. The upper end of the pump body 10 is assembled to the pump cover 1 and a connection portion of them it is sealed by a first sealing ring 6, and the lower end is enclosed by the back cover 14. The injection molded pump body 10 includes an outer shell surrounding an outer contour of the assembled coils and stator core, and an inner cylinder at the center of the outer shell and form a magnetic core accommodating space. The inner cylinder has a unenclosed space with an open at its upper, lower ends and lateral side, and it communicate with the space where the stator core is located. A supporting member for supporting the bearing of the rotating shaft is arranged at the opened upper end of the inner cylinder. The rotating shaft 11 extends through the shaft hole of the magnetic core 15, from the pump body to the pump cover. An upper end of the rotating shaft is fixed to the impeller to drive the impeller to synchronously rotate with it.

The rotor cylinder 9 with an enclosed bottom is provided in the space of the inner cylinder. The magnetic core 15 is accommodated inside of the rotor cylinder 9. The rotor cylinder 9 has a stainless steel cylinder body 9.1 with a length larger than a height of the magnetic core and a rubber plug 9.2 for enclosing the stainless steel cylinder body 9.1. The rubber plug has a bearing-mounting hole for assembling a back rotating bearing to a bottom of the rotating shaft. A second sealing ring 4 is arranged between the rubber plug and the rotor cylinder. The two arms of the U-shaped stator core 8 extend through the coils 7 to both sides of the rotor cylinder 9, and the magnetic core accommodating space is communicate with the space where the two arms of the U-shaped stator core are located. Since the stator core and the magnetic core are separated by a very thin stainless steel cylinder body 9.1, the gap between then may be significantly reduced.

In the present embodiment, the pump body 10 is also provided with a water cooling chamber 13. At least part of a wall of the water cooling chamber is formed to surround a portion that the two arms of the U-shaped stator core interfere with the magnetic core. The water cooling chamber has an opening faced upward which sealed by the press cover 3, so it is not communicate with the magnetic core accommodating space. The water cooling chamber is disposed outside the stator core 8 and closed against it to quickly transfer heat being generated by the stator core during operation to cooling liquid in the water cooling chamber. It is achieve heat dissipation and cooling of the motor. However, the pump body in another embodiment may also be formed without the water cooling chamber.

The opened upper portion of the inner cylinder is provided with the bearing 12 of the rotating shaft, and a sealing ring 5 is applied to provide a sealing connection between them. The sealing ring 5 prevents water inside the pump cover from flowing into the pump body therethrough. The press cover 3 also serves as a bearing support for the bearing 12 of the rotating shaft.

A connecting portion of the pump cover 1 and the pump body 10 is provided with a first sealing ring 6, to prevent water from entering the pump body, or to prevent water in the pump cavity for accommodating the impeller from leaking during operation.

A Third Embodiment

As shown in FIGS. 6, 7, 8, 9 and 10, it shows the third embodiment of the structure of an alternating-current permanent magnet drainage pump of the present invention.

The alternating-current permanent magnet drainage pump of the present invention includes: a pump body 10, a pump cover 1 connecting to the pump body 10, an impeller 2 accommodated in the pump cover 1, a rotor assembly and a stator assembly accommodated in the pump body 10. The stator assembly has coils 7 and a stator core 8, and the rotor assembly has a magnetic core 15 and a rotating shaft 11.

Specifically, the pump body 10 includes a first pump body portion 10a at least sealing around the coils 7 and a second pump body portion 10b for accommodating the rotor assembly 20, and the first pump body portion 10a and the second pump body portion 10b are combined into one.

The second pump body portion 10b is provided therein with a rotor housing 17 for sleeving on the rotor assembly 20 to support it. A concave arc portion 81 of the stator core 8 is embedded in the rotor housing 17 which has a tubular shape with one end opened, so that an inner arc surface 81a of the concave arc portion 81 serves as a part of an inner arc surface 17a of the rotor housing 17. The inner arc surface 17a of the rotor housing and the inner arc surface 81a of the embedded concave arc portion 81 together form an accommodating inner cavity, i.e. a magnetic core accommodating space 10.1 for mounting and supporting the rotor assembly including the magnetic core and the rotating shaft. A connection portion 18 at side edge of the second pump body portion 10b connects to the pump cover 1.

Figure 13:
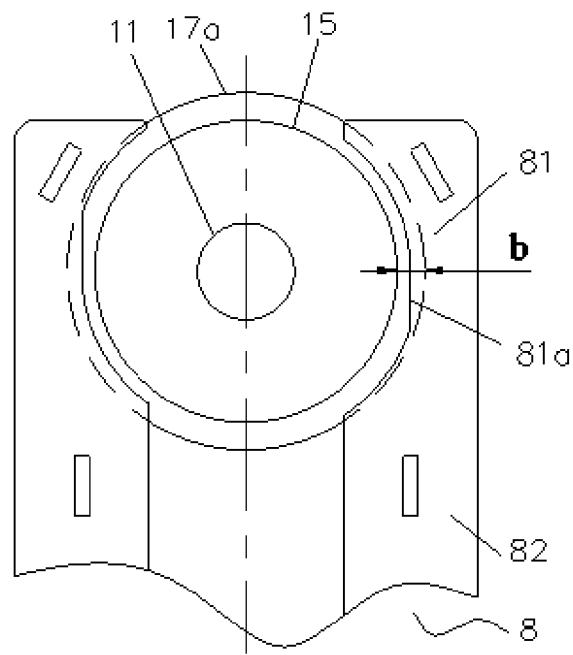
FIG. 13 is a schematic diagram of the first position relationship between a concave arc portion of the stator core and a part of an inner arc surface of a rotor housing in the third embodiment.
Figure 14:
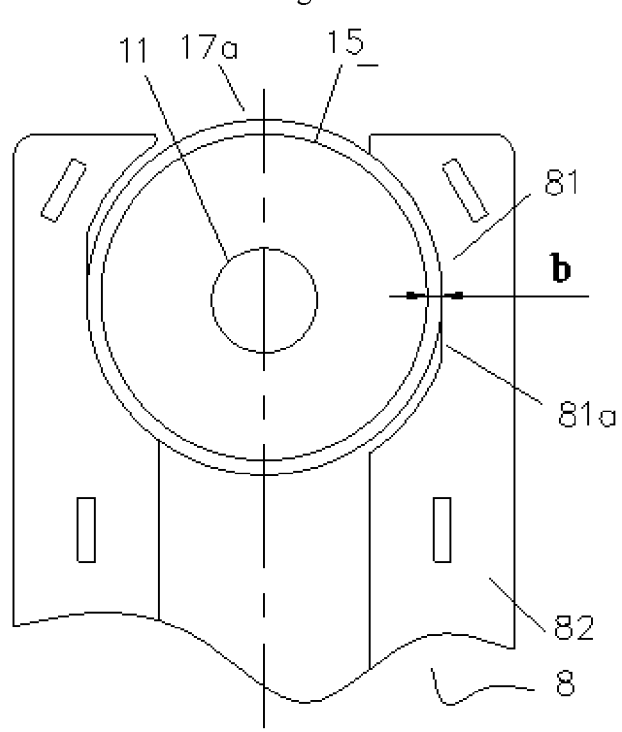
FIG. 14 is a schematic diagram of the second position relationship between a concave arc portion of the stator core and a part of an inner arc surface of a rotor housing in the third embodiment.

When part or whole of the inner arc surface 81a of the stator core 8 serves as part of the inner arc surface 17a of the rotor housing 17, a magnetic air gap between the outer surface of the magnetic core 15 and the inner arc surface 81a of the stator core 8 is equal to a distance b (as shown in FIG. 14) between the outer surface of the magnetic core 15 and the inner arc surface 17a of the rotor housing 17. When the inner arc surface 81a of the stator core 8 protrudes the inner surface 17a of the rotor housing 17 toward the axial center direction, the magnetic air gap a is smaller than the distance b (as shown in FIG. 13).

It should be noted that, part of the inner arc surface 81a of the stator core 8 serving as part of the inner arc surface 17a of the rotor housing 17 means that part of the former is exposed to be part of the latter, and the rest of the former (for example, a terminal portion) is enclosed by the second pump body portion, Thus, the gap between the outer surface of the magnetic core 15 of the rotor assembly and the inner arc surface 81a of the stator core 8 can be significantly reduced. That is, the magnetic air gap a between the stator core 8 and the magnetic core 15 of the rotor assembly is minimized so that a magnetic resistance can be reduced, and electromagnetic efficiency can be significantly enhanced.

In particular, since the gap between the inner arc surface 81a of the stator core 8 and the outer surface of the magnetic core 15 is minimized and the electromagnetic efficiency is effectively enhanced, for keep starting torque or operation performance unchanged, the drainage pump of the present invention saves one third (⅓) of the silicon steel sheets required for that of the conventional structure. Thus, a length of the magnetic core may be shorten by one third (⅓), and the enameled wire constituting the coils may in turn be correspondingly reduced, thereby the manufacturing cost of the drainage pump be effectively reduced.

As shown in FIG. 12, the stator core 8 is U shaped. It has a pair of projecting arms 82 and a pair of concave arc portions 81 respectively at an end of the projecting arms 82. A cavity for accommodating the magnetic core 15 is surrounded and formed by the inner arc surfaces of both the concave arc portions 81.

When one-shot injection molding is used to make the pump body 10, the stator core 8 and the coils 7 are processed with a molding mold and molding material in one go to form the first pump body portion 10a and the second pump body portion 10b which are integrated into one. Preferably, the molding material is BMC material.

Firstly, the coils 7 are formed by a former, enameled wires, plug-in wiring terminals, a thermal protecter and insulation tapes, and the U-shaped stator core 8 are processed with a passivation treatment and an electrophoretic treatment. Then, the two arms 82 of the stator core 8 extends through the coils 7 so that the concave arc portion 81 of the stator core 8 projects to outside of the coils 7. Finally, the coils 7 and the stator core 8 are put in a molding mold and processed with one-shot of injection molding to form the pump body 10 including the first pump body portion and the second pump body portion which wrap around the coils 7 and the stator core 8.

Specifically, the first pump body portion 10a surrounds and seals the parts of the coils 7 and the stator core 8 which are inside of the coils 7, that is, the first pump body portion surrounds and seals the elements constituting the coils 7 (except the plug-in wiring terminal), to isolate it from the outer atmosphere. Both the part of the stator core 8 which is inside the coils and its end portion opposite to the concave arc portion 81 are surrounded and sealed by the first pump body portion 10a to isolate them from the outer atmosphere.

The concave arc portion 81 of the stator core 81 which projects to outside of the coils 7 is embedded in the second pump body 10b. The rotor housing 17 of the second pump body portion 10*b* is a cylinder with one end opened, and the inner arc surface of the rotor housing and the inner arc surface of the concave arc portion 81 together form a cavity for accommodating the rotor assembly. Moreover, an axial line L (as shown in FIG. 12) of the concaved cavity, which is surrounded by the concave arc portion 81 of the stator core 8 to accommodate the rotor assembly, coincides with a central line of the rotor housing 17 of the second pump body portion.

As the result of the inner arc surface 81*a* of the concave arc portion 81 of the stator core 8 and the inner arc surface 17*a* of the stator housing 17 together forming the inner cavity for accommodating the rotor assembly, the air gap between the outer surface of the magnetic core 15 of the rotor assembly and the inner arc surface 81*a* of the stator core 8 can be minimized, so as to significantly reduced magnetic resistance and enhance electromagnetic efficiency.

When two-shot injection molding is adopted to make the pump body 10, firstly, the first pump body portion 10*a* of the pump body 10 for sealing coils is formed by conducting a first shot of injection molding on the coils. Then, a stator core 8 is assembled to the first pump body portion 10*a*, and the first pump body portion 10*a* and the stator core 8 are taken as a base to form the second pump body portion 10*b* combining the first pump body portion 10*a* into one by a second shot of injection molding.

When the pump body 10 is manufactured by two-shot injection molding, the first pump body portion 10*a* of the pump body 10 is made of BMC (Bulk Molding Compound) material, and the second pump body portion 10*b* is made of thermoplastic material which can be readily molded, such as PP material. However, the second pump body portion 10*b* may also be made of BMC material.

Whether the pump body 10 is formed by the one-shot injection molding or the two-shot injection molding, the first pump body portion 10*a* of the pump body 10 at least packages the coils 7. That is, the coils are enclosed hermetically by the first pump body portion 10*a* through injection molding. Thus, the coils 7 and the first pump body portion 10*a* are integrated into one, it not only reduces resonance and noise of the product, but also facilitate heat dissipation.

Specifically, the first pump body portion 10*a* can be formed by using a molding mold and molding material to conduct injection molding on prefabricated coils 7. It enclosed hermetically the coils 7 so that all elements constituting the coils 7 except some elements of a plug-in wiring terminal are completely isolated from outer atmosphere, so as to avoid them contacting air. In way of assembling, the stator core 8 is inserted into the coils 7 being enclosed hermetically by the first pump body portion 10*a*, and a concave arc portion 81 of the stator core 8 protrudes from the first pump body portion 10*a*.

Alternatively, the first pump body portion 10*a* may also be formed by using a molding mold and molding material and conducting injection molding to the prefabricated coils 7 and a part of the stator core 8 being mounted inside the stator coils 7. Specifically, after the coils 7 are fabricated, the part of the stator core 8 is mounted inside the coils 7, and a pair of projecting arms of the stator core 8 protrudes outside the coils 7. Then, a molding mold and molding material is applied to conduct an injection molding on the coils 7 and the part of the stator core 8 which is mounted inside the stator coils 7 so that they are enclosed hermetically by the first pump body portion 10*a*, and the concave arc portions 81 of the pair of projecting arms of the stator core 8 protrude outside the first pump body portion 10*a*. Thus, elements constituting the coils 7 are completely isolated from outer atmosphere except several elements of a plug-in wiring terminal, so as to avoid them contacting air. Moreover, the part of the stator core 8 which is mounted inside the coils 7, together with the coils 7, is surrounded and sealed by the first pump body portion 10*a* so that it was completely isolated from the outer atmosphere.

The second pump body portion 10*b* is formed by taking a molding mold and conducting injection molding on the first pump body portion 10*a* with the stator core 8 and surrounds the coils 7, and it is combined with the first pump body portion 10*a* into one.

The second pump body portion 10*b* seals and surrounds only the rest part of the stator core 8 except the inner arc surface of the concave arc portion 81, such that the concave arc portion 81 protruding outside the first pump body portion 10*a* is embedded in the second pump body portion 10*b*. The second pump body portion 10*b* includes the rotor housing 17 and the connection portion 18. The rotor housing 17 is a cylinder with one end opened, and has an inner cavity to sleeve on and to support the rotor assembly. The connection portion 18 is disposed at the side edge of the second pump body portion 10*b* for connecting to the pump cover 1.

The concave arc portion 81 of the stator core 8 is embedded in the rotor housing 17. A part or the whole of the inner arc surface 81*a* of the concave arc portion 81 forms a part of the inner arc surface 17*a* of the rotor housing 17, and they together constitutes the inner cavity for accommodating the rotor assembly. A part of the inner arc surface 81*a* of the concave arc portion 81 protrudes the inner surface 17*a* of the rotor housing 17 (as shown in FIG. 13) toward a center axial direction, or is leveled or even with the inner surface 17*a* of the rotor housing 17 (as shown in FIG. 14).

Figure 8:
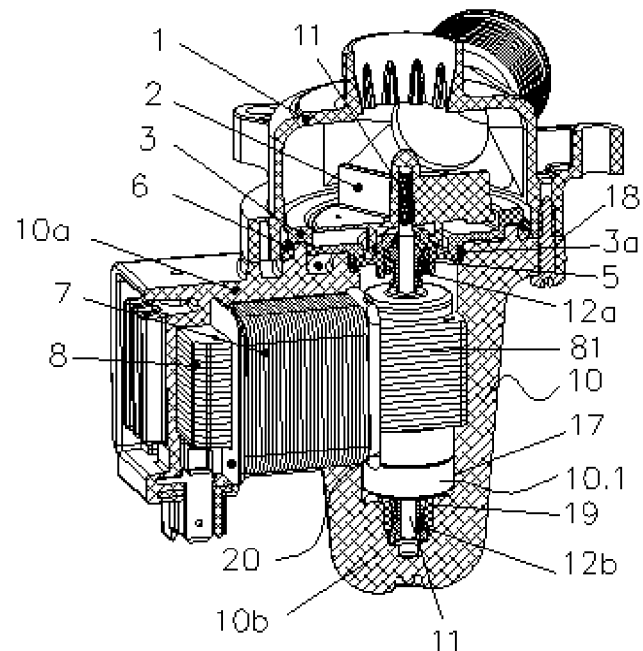
FIG. 8 is a partial cross sectional view of the alternating-current permanent magnet drainage pump as shown in FIG. 6.
Figure 9:
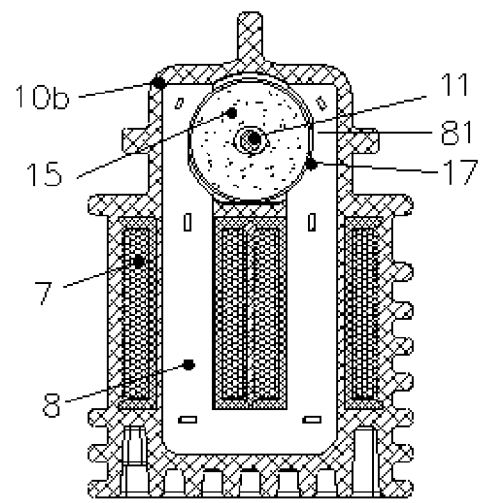
FIG. 9 is a cross sectional view of the alternating-current permanent magnet drainage pump along line A-A as shown in FIG. 6.
Figure 10:
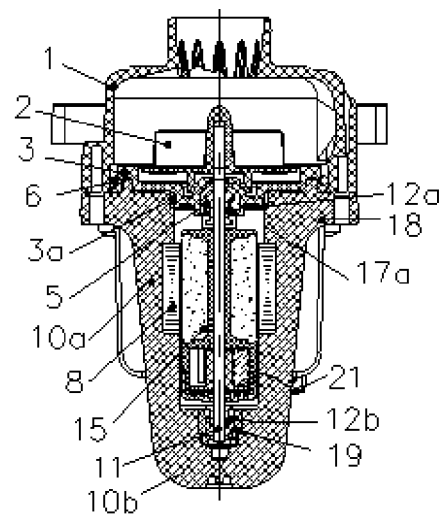
FIG. 10 is a cross sectional view of the alternating-current permanent magnet drainage pump along line B-B as shown in FIG. 7.
Figure 11:
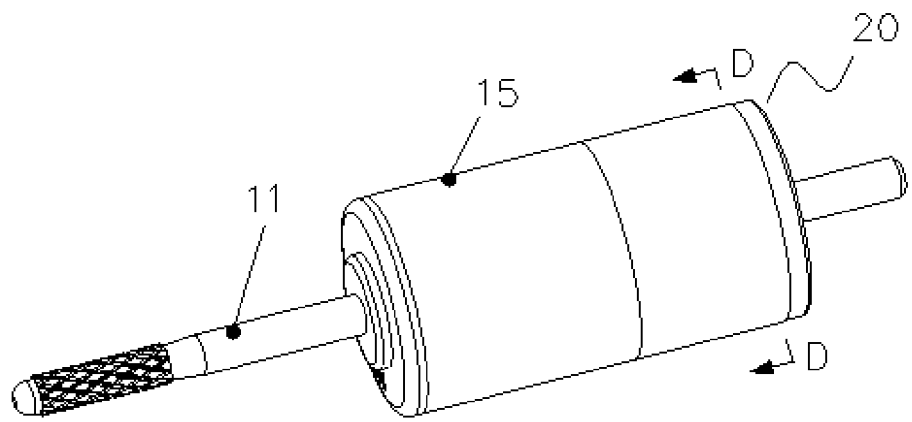
FIG. 11 is a schematic structural diagram of a rotor assembly of the present invention.

A bearing seat 19 is provided at the enclosed end of the rotor housing 17, and the rotor assembly is inserted into the rotor housing 17 through the opened end of the rotor housing 17, such that the magnetic core 15 is disposed in the cavity surrounded by both the inner arc surfaces 81*a* of the concave arc portions 81 of the stator core 8. In addition, a press cover 3 is mounted between the second pump body portion 10*b* and the pump cover 1. Moreover, in order to ensure sealing, as shown in FIG. 8, a first sealing ring 6 is provided between the pump cover 1 and the press cover 3, and a sealing ring 3*a* for the press cover is provided between the press cover 3 and the pump body 10.

Bearings 2 are respectively mounted at both ends of the rotating shaft 11. The bearing 2*a* is connected to the press cover 3 via a sealing ring 5 for a bearing. The bearing 2*b* is supported by the bearing seat 19 of the rotor housing 17. The bearing 2*a* and the bearing 2*b* together supports the rotating shaft 11, so as to avoid the rotating shaft swaying in radial or axial direction.

A starting mechanism 21 for driving the rotating shaft 11 to rotate together with the magnetic core 15 is provided on the rotating shaft 11, and is accommodated at one end of the magnetic core 15 which is away from the impeller 2 or close to the impeller 2. The figures only show the starting mechanism 21 being mounted at the end of the magnetic core 15 which is away from the impeller 2.

Specifically, the magnetic core 15 is accommodated in the concave arc portion 81 of the stator core 8, and a rotating gap (i.e. the magnetic air gap) is provided between the outer surface of the magnetic core 15 and the inner arc surface of the concave arc portion 81. Preferably, the rotating gap is 0.5 mm. Generally, the inner arc surface of the concave arc portion 81 is formed by two sections of arcs with different radii. The rotating gap refers to a gap formed between an arc surface with a smaller one of radii and the outer surface of the magnetic core 15 (as shown in FIGS. 13 and 14). Since the inner arc surface of the concave arc portion 81 of the stator core 8 serves as a part of the inner arc surface of the rotor housing 17, the magnetic gap between the magnetic core 15 and the stator core is reduced, and further the magnetic resistance is decreased and the electromagnetic efficiency is enhanced.

When the coils 7 has an alternating current, it generate an alternating magnetic field which passes through the stator core 8 to drive the magnetic core 15 of the rotor assembly to rotate forwardly or reversely. Since the magnetic core 15 is sleeved by the rotating shaft 11, when the magnetic core 15 rotates forwardly or reversely, the rotating shaft 11 is driven by the starting mechanism 21 to rotate. Since the rotating shaft 11 is fixed to a rotation center of the impeller 2, the rotation of the rotating shaft 11 brings the impeller 2 to rotate with it forwardly or reversely, so as to achieve a drainage function.

Although the present invention has been described as above, it is not limited thereto. One skilled in the art may make modification according to the principle of the present invention. Therefore, it should be appreciated that various modification made according to the principle of the present invention will fall in the protective scope of the present invention.

What is claimed is:

1. An alternating-current permanent magnet drainage pump with reduced vibration noise, comprising a pump cover and a pump body, and further comprising a magnetic core, a rotating shaft, a U-shaped stator core and coils, wherein the coils wind around a coil former and the stator core is assembled to the coils, wherein
   the pump body is a shell body which is formed by conducting an integrated injection molding around a contour of the coils, the coil former and the stator core which are assembled together, and a magnetic core accommodating space is formed in the shell body for accommodating the magnetic core;
   the magnetic core accommodating space extends along the shell body, which is formed by the integrated injection molding around the contour of the coils, the coil former and the stator core being assembled together, wherein the magnetic core accommodating space has an opening at its top, and wherein a supporting member is arranged in the opening to support a bearing of the rotating shaft,
   the shell body formed by the integrated injection molding comprises at least a first pump body portion enclosing hermetically the coils and a second pump body portion being used to install the rotor assembly, and the first pump body portion and the second pump body portion are formed together as a whole by the integrated injection molding;
   the second pump body portion is provided therein with a cylinder-shaped rotor housing for supporting the rotor assembly, and the magnetic core accommodating space is surrounded and formed by an inner surface of the rotor housing; and
   a concave arc portion of the stator core is embedded in the rotor housing so that the concave arc portion of the stator core is inserted into the rotor housing.

2. The alternating-current permanent magnet drainage pump according to claim 1, wherein
   a stator assembly comprising the coils and the stator core and a rotor assembly comprising the rotating shaft and the magnetic core being disposed on the rotating shaft are arranged inside the pump body, the stator assembly generating an alternating magnetic field to the magnetic core so as to drive it to rotate; and
   the second pump body portion is provided with a connection portion for connecting to the pump cover.

3. The alternating-current permanent magnet drainage pump according to claim 2, wherein the first pump body portion and the second pump body portion of the pump body are formed by one-shot injection molding or two-shot injection molding.

4. The alternating-current permanent magnet drainage pump according to claim 3, wherein the coils are arranged in the first pump body portion, and the concave arc portion of the stator core projects beyond the first pump body portion.

5. The alternating-current permanent magnet drainage pump according to claim 2, wherein the inner surface of the rotor housing is an arc surface, and the magnetic core accommodating space for accommodating the magnetic core is surrounded and formed by the arc surface together with an inner arc surface of the concave arc portion which is embedded in the rotor housing.

6. The alternating-current permanent magnet drainage pump according to claim 5, wherein the inner arc surface of the concave arc portion of the stator core is configured to be a part of the inner surface of the rotor housing.

7. The alternating-current permanent magnet drainage pump according to claim 5, wherein the magnetic core accommodating space for accommodating the magnetic core is surrounded and formed by a part of the inner arc surface of the concave arc portion of the stator core together with the inner surface of the rotor housing.

8. The alternating-current permanent magnet drainage pump according to claim 5, wherein the magnetic core accommodating space for accommodating the magnetic core is surrounded and formed by an entirety of the inner arc surface of the concave arc portion of the stator core together with the inner surface of the rotor housing.

9. The alternating-current permanent magnet drainage pump according to claim 2, wherein the stator core is sealed and surrounded by the pump body except for an inner arc surface of the concave arc portion.

10. The alternating-current permanent magnet drainage pump according to claim 2, wherein the second pump body portion is provided therein with a water cooling chamber surrounding an outer wall of the rotor housing and having an opening at one end.

11. The alternating-current permanent magnet drainage pump according to claim 1, wherein the pump body comprises an outer shell body being formed by surrounding an outer contour of the coils and the stator core which are assembled, and an inner shell body being disposed at center of an inner cavity of the outer shell body and serving as the magnetic core accommodating space, and the U-shaped stator core having two arms extending through a wall of the inner shell body and sandwiching on the magnetic core from two sides, leaving a rotating gap between the two arms of the U-shaped stator core and the magnetic core.

12. The alternating-current permanent magnet drainage pump according to claim 1, further comprising a stainless steel rotor cylinder, the magnetic core is arranged in an inner cavity of the stainless steel rotor cylinder, the rotor cylinder is accommodated inside the magnetic core accommodating space; the U-shaped stator core having two arms sandwiching on the stainless steel rotor cylinder from two sides.

13. The alternating-current permanent magnet drainage pump according to claim 11 wherein the pump body further comprises a water cooling chamber used for holding cooling water, the water cooling chamber presenting an annular space which is formed on an outer contour of a portion where the two arms of the U-shaped stator core interfere with the magnetic core.

14. The alternating-current permanent magnet drainage pump according to claim 13, wherein the water cooling chamber has an opening at a top, and a press cover is provided on the opening.

15. The alternating-current permanent magnet drainage pump according to claim 1, wherein a sealing ring hermetically connects the bearing of the rotating shaft to a bearing member for the bearing of the rotating shaft.

16. The alternating-current permanent magnet drainage pump according to claim 1, wherein the pump cover and the pump body are assembled together and a connection portion of them is sealed by a sealing ring.

17. The alternating-current permanent magnet drainage pump according to claim 1, wherein the shell body has an enclosed bottom formed by integrated injection molding.

18. The alternating-current permanent magnet drainage pump according to claim 1, wherein the pump body has an opened bottom which is enclosed by a back cover and is sealed by a sealing ring.

19. An alternating-current permanent magnet drainage pump with reduced vibration noise, comprising a pump cover and a pump body, and further comprising a magnetic core, a rotating shaft, a U-shaped stator core and coils, wherein the coils wind around a coil former and the stator core is assembled to the coils, wherein the pump body is a shell body which is formed by conducting an integrated injection molding on a contour of the coils, the coil former and the stator core being assembled together, the shell body is configured to have a magnetic core accommodating space for accommodating the magnetic core, wherein the magnetic core has an opening at its top, and a supporting member is arranged in the opening to support a bearing of the rotating shaft;

a stator assembly comprising the coils and the stator core and a rotor assembly comprising the rotating shaft and the magnetic core being disposed on the rotating shaft are arranged inside the pump body, the stator assembly generating an alternating magnetic field to the magnetic core so as to drive it to rotate;

the pump body comprises at least a first pump body portion enclosing hermetically the coils and a second pump body portion being used to install the rotor assembly, and the first pump body portion and the second pump body portion are formed together by the integrated injection molding;

the second pump body portion is provided therein with a cylinder-shaped rotor housing for supporting the rotor assembly, and the magnetic core accommodating space is surrounded and formed by an inner surface of the rotor housing;

the second pump body portion is provided with a connection portion for connecting to the pump cover;

a concave arc portion of the stator core is embedded in the rotor housing; and at least a part of an inner arc surface of the stator core protrudes from an inner surface of the rotor housing toward an axial center direction.

* * * * *